United States Patent [19]

Walker

[11] Patent Number: 4,922,541

[45] Date of Patent: May 1, 1990

[54] ACOUSTIC HORN AUDIO REPRODUCER

[76] Inventor: Benjamin L. Walker, P.O. Box 1763, San Diego, Calif. 92112

[21] Appl. No.: 390,153

[22] Filed: Aug. 7, 1989

Related U.S. Application Data

[63] Continuation-in-part of Ser. No. 232,855, Aug. 16, 1988, abandoned.

[51] Int. Cl.[5] ........................ G10K 11/02; H04R 9/06; H04R 11/00; H04B 13/00

[52] U.S. Cl. .................................... 381/156; 381/192; 381/194; 381/199; 381/201

[58] Field of Search ............... 381/156, 192, 194, 197, 381/199, 200, 201, 202, 203

[56] References Cited

U.S. PATENT DOCUMENTS

| | | | |
|---|---|---|---|
| 1,568,589 | 1/1926 | Eddington | 381/156 |
| 2,790,164 | 4/1957 | Oberg | 340/388 |
| 3,016,430 | 1/1962 | Hoodwin | 381/156 |
| 4,706,295 | 11/1987 | Putnam et al. | 381/156 |
| 4,796,009 | 1/1989 | Biersach | 381/156 |

*Primary Examiner*—Jin F. Ng

*Assistant Examiner*—Danita R. Byrd

*Attorney, Agent, or Firm*—Vaden, Eickenroht, Thompson & Boulware

[57] ABSTRACT

An apparatus for audio reproduction, specifically, transduction of electrical signals into acoustic signals, or sound waves, which minimizes acoustic impedance matching problems and distortion by mounting a diaphragm inside the body of a horn having a mouth for passage of sound waves at the end of the horn on one side of the diaphragm and an open end at the end of the horn on the other side of the diaphragm. The diaphragm is mounted in a voice coil collar having a voice coil wound therearound, and smaller, secondary magnets are mounted to the collar on both sides of the diaphragm. The horn is provided with large, primary magnets on either side of the collar, and the orientation of the magnets causes the collar to be suspended at exactly the midpoint therebetween. When current is applied to the coil, the collar, carrying the diaphragm, reciprocates within the horn to produce sound waves out of the mouth of the horn, the open end at the other end of the horn acts to equalize air pressure within the horn.

5 Claims, 1 Drawing Sheet

ACOUSTIC HORN AUDIO REPRODUCER

This application is a continuation-in-part of my co-pending application Ser. No. 07/232,855, filed on Aug. 16, 1988, now abandoned.

BACKGROUND OF THE INVENTION

The present invention relates to an electromagnetic device for accurate acoustic transduction of electrical audio amplifier current; for converting electrical energy into the physical energy of sound waves. More particularly, the present invention relates to a single-driver acoustic horn audio reproducer comprising a transducer element, or piston, mounted within a suspension sleeve/horn at a point allowing equal air pressure on both sides of a diaphragm mounted in the transducer element during operation.

Since it was first proved that recording sound on a tangible medium is possible, there have been numerous efforts to improve the quality of reproduction of recorded sound. These efforts include great advances in transcription methodology, but audio reproducers, or speakers, remain an area in which considerable room remains for improvement.

So far as is known, all audio speakers fail to translate the electrical signals produced by audio amplifiers faithfully as a result of a series of compromises in their construction, design, components, size, and purpose, all of which are generally a reflection of the price at which the speaker sells. Further, all audio reproducers exhibit frequency distortion because of a number of factors, including the non-rigid character of the material comprising the speaker diaphragm (sometimes referred to as "cone break-up"), improper acoustic impedance matching, biased magnetic structure, odd-order over/under resonances (which are caused both electromechanically and by the housing/bafflings of the loudspeaker), diaphragm suspension characteristics, and by the crossover networks necessitated by multi-driver systems.

The non-rigidity of the material comprising the diaphragm and acoustic impedance matching problems are two major sources of distortion. It is possible to minimize the distortion caused by these two sources. Sound reproduction of acceptable quality has been achieved in single-driver headphones designed for low power applications (less than 1 watt) in which sound pressure level and frequency response is optimal when worn close to the ear. When scaled up for use as a loudspeaker, however, the quality of sound reproduction by these devices in an open space deteriorates unless stationed within an acoustic horn.

It is, therefore, an object of this invention to provide improved high quality audio reproduction by minimizing physical distortion of the diaphragm and acoustic impedance matching problems.

SUMMARY OF THE INVENTION

This object is achieved by providing an audio transducer comprised of a logarithmically curved, elongate horn having both ends thereof open to the atmosphere, the opening in the end of the horn through which sound waves are directed being larger in diameter than the opening at the other end of the horn. First and second magnets are spaced along the length of the horn, and a voice coil collar is positioned within the horn between the first and second magnets, the diameter of the collar being sized so that the outer surface thereof closely approximates the inside surface of the walls of the horn. Third and fourth magnets are mounted to the voice coil collar for suspending the collar in the magnetic field of the first and second magnets and positioning the collar midway between those magnets. A voice coil is wound around the outside of the collar and a diaphragm mounted across the inside of the collar so that, when the collar is suspended by the magnetic field of the first and second magnets, the diaphragm effectively partitions the interior of the horn into two portions. When current is applied to the voice coil, causing the collar to reciprocate within the horn, the diaphragm moves the air inside the horn to produce sound waves out the larger diameter opening thereof. The opening at the other end of the horn helps to equalize the air pressure on both sides of the diaphragm.

The diaphragm is preferably comprised of a rigid material so as to minimize distortion of the sound waves but is light in weight so as not to affect the compliance of the transducer and the linearity of the frequency response by the transducer. Positioning of the transducer at the approximate midpoint between the horn mouth and open end is determined by a combination of variable factors such as assigned frequency response, sound pressure level, Q factor(s), power input and heat dissipation in a manner well known to those skilled in the art.

The horn has no openings other than the horn mouth and horn end. These openings, coupled with the slidably mounted transducer assembly, operate to equalize the air pressure on both sides of the diaphragm and to facilitate acoustic impedance matching. The horn material is rigid and nonresonant within the assigned frequency response range and the horn is logarithmically curved between the diaphragm and the larger diameter horn mouth. Provided that the flare of the horn mouth is logarithmically curved, the invention can be implemented in various sizes and shapes applicable to many uses including, but not limited to, both home and commercial entertainment and both industrial and military uses.

DETAILED DESCRIPTION OF THE PREFERRED EMBODIMENT

Figure 1:
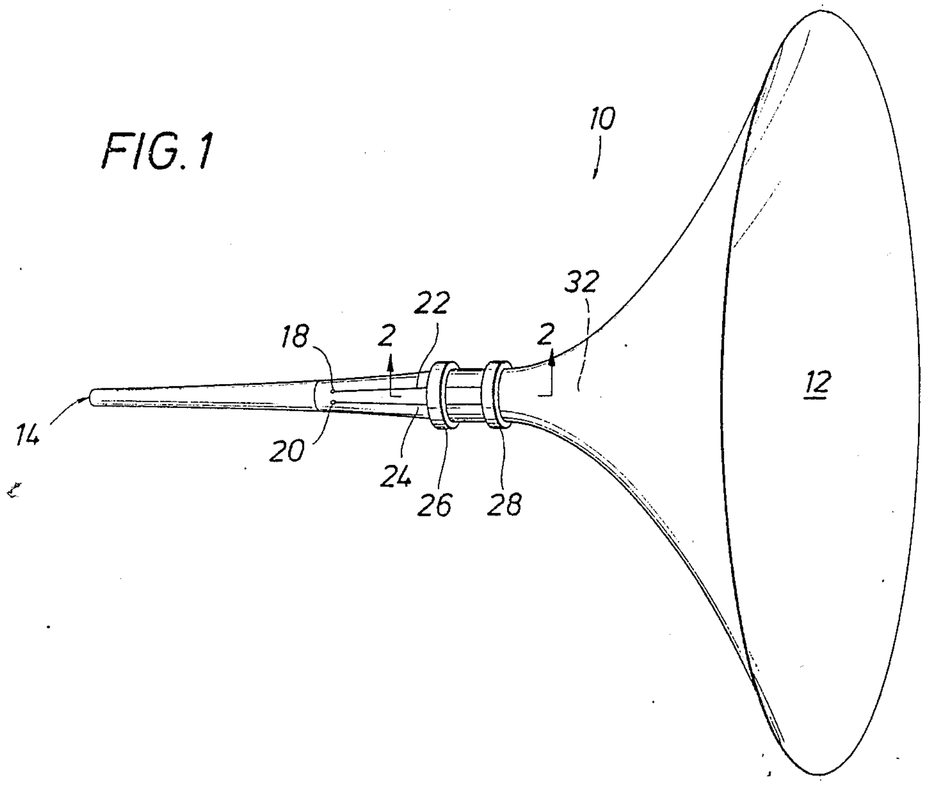
FIG. 1 is a perspective view of a presently preferred embodiment of an audio transducer constructed in accordance with the present invention.

Referring to FIG. 1, there is shown an elongate horn 10 having both ends thereof, a horn mouth 12 and a horn end 14, open to the atmosphere. Horn 10 is logarithmically curved, or flared, between diaphragm 16 and horn mouth 12. Horn mouth 12 is, therefore, larger in diameter than the opening of horn end 14 at the other end of horn 10, sound waves passing out of horn 10 therethrough. Horn 10 may be shaped in any configuration to meet constraints such as size limitations, provided that: horn 10 is logarithmically curved between diaphragm 16 and horn mouth 12; the diaphragm 16 is positioned at the point of pressure equalization as described below; and horn end 14 remains open.

Horn 10 is provided with positive and negative terminals 18 and 20, respectively, for connection of flexible positive and negative wires 22 and 24, respectively, to a source of electrical signals (not shown), namely an audio amplifier. Horn 10 is also provided with first and second permanent magnets 26 and 28, respectively, spaced along the length of horn 10. Due to their size and function as described below, magnets 26 and 28 are collectively referred to herein as first and second primary magnets. The magnetic polarity of first primary magnet 26 is south to north from the open end 14 of horn 10 and the magnetic polarity of second primary magnet 28 is north to south from the open end 14 of horn 10.

Figure 2:
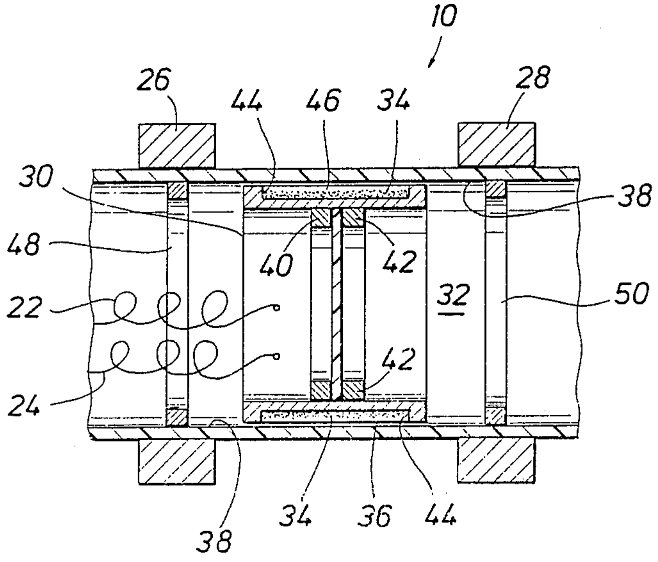
FIG. 2 is a partial cross-sectional view, taken along the lines 2—2 in FIG. 1, of the audio transducer of FIG. 1.

FIG. 2 shows an enlarged, cross-sectional view of the transducer assembly mounted within horn 10. The diaphragm 16 is mounted across the inside of a non-conducting voice coil collar 30 positioned in the interior 32 of horn 10 between first 26 and second 28 primary magnets. A voice coil 34 is wound around collar 30 (because FIG. 2 is sectional, only the cut ends of the fine wire comprising voice coil 34 can be seen in FIG. 2, and the cut ends are themselves shown somewhat schematically, it being impracticable to show the many cut ends of the wire comprising the voice coil 34 clearly), starting at the end of collar 30 closest to horn end 14 and ending at the end closest to horn mouth 12 so that the positive end of voice coil 34 is near the north pole of first primary magnet 26 and the negative end is near the north pole of second primary magnet 28. The ends of voice coil 34 are connected to positive terminal 18 and negative terminal 20 by the flexible wires 22 and 24, respectively. The wire of voice coil 34 and leads 22 and 24 is preferably comprised of gold, an ideal conductor, for optimum signal quality and minimum power dissipation. Diaphragm 16 is preferably comprised of a material which is sufficiently light in weight and rigid, which does not resonate over the assigned frequency range (e.g., from about 30 to about 20 thousand cycles per second), to produce a frequency response with linearity and bandwidth exceeding the human ear's ability to hear.

The diameter of collar 30 is sized so that the outer surface 36 thereof closely approximates the inside surface 38 of the walls of horn 10. In other words, there is minimal tolerance, or space, between collar 30 and the walls of horn 10. Collar 30 is also provided with a pair of secondary third and fourth magnets 40 and 42, respectively, smaller in size than primary magnets 26 and 28, on either side of diaphragm 16. The north pole of third magnet 40 is opposite the north pole of first primary magnet 26 and the north pole of secondary fourth magnet 42 is opposite the north pole of second primary magnet 28. By mounting the primary magnets 26 and 28 and the secondary magnets 40 and 42 in this S-N-n-s-s-n-N-S orientation (upper case letters denoting magnetic polarity of the primary magnets; lower case denoting magnetic polarity of the secondary magnets), the collar 30 is suspended in the magnetic field of the first and second magnets 26 and 28 and positioned exactly midway therebetween.

Positioning the voice coil collar 30 midway between primary magnets 26 and 28 causes the diaphragm 16 to effectively divide or partition the interior 32 of horn 10 off into two portions. By partitioning the interior 32 in that fashion, when current is applied to voice coil 34, causing collar 30 to reciprocate within horn 10, air from the interior 32 of horn 10 is vibrated to produce sound waves out of the larger diameter horn mouth 12 while the opening at horn end 14, by virtue of the small size of that opening, and length equalizes the air pressure on the other side of diaphragm 16.

As will be apparent to those skilled in the art who have the benefit of this disclosure, the better the seal which can be obtained between the two portions of the interior 32 of horn 10, the more efficiently the electrical signals are translated into sound waves passing through horn mouth 12. Consequently, the closer the fit between the outside surface 36 of collar 30 and the inside surface 38 of horn 10, the better the seal that is effected between the two portions of the interior 32 of horn 10. To better effect that seal, collar 30 is provided with an annular recess, or groove, 44 in which the voice coil 34 is wound. Voice coil 34 is then covered by an epoxy or other electrically non-conductive material 46 to form a smooth and continuous outer surface 36 of collar 30. Preferably, a lightweight graphite lubricant (not shown) is applied between the outer surface 36 of collar 30 and the inner surface 38 of horn 10 to aid the reciprocating movement of collar 30 and minimize wear. Additionally, or alternatively, the surfaces 36 and 38 are provided with a TEFLON (tm) or other non-stick coating.

The range of reciprocating movement is defined electrically by power input and by stops 48 and 50, which physically limit the travel of collar 30. Primary magnets 26 and 28 are high flux, permanent magnets. Secondary magnets 40 and 42 are of lesser mass and flux than primary magnets 26 and 28. When current polarity is positive with respect to coil 34 at the positive input terminal 18 and negative at the negative input terminal 20, the flow of current through coil 34 causes collar 30 to be repelled from first primary magnet 26 while being attracted to second primary magnet 28. Conversely, when current polarity with respect to coil 34 is negative, the current through coil 34 causes collar 30 to be repelled from second primary magnet 28 and to be attracted to first primary magnet 26. In this manner, the reciprocating movement of collar 30 provides improved transient response and linearity.

The drawings as shown and described are drawings of but a single presently preferred embodiment of the invention. Those skilled in the art who have the benefit of this disclosure may be enabled by this description to make various modifications to that preferred embodiment which may alter the appearance thereof, but not the scope, spirit, and intention of the inventor. For instance, the foregoing description is of an embodiment in which the coil reciprocates. Those skilled in the art will recognize that the same objects could be achieved with a moving magnet transducer assembly. It is the intention of the inventor that such modifications will be included within the scope of the present invention as set out in the following claims:

What is claimed is:

1. An audio transducer comprising:

an elongate horn having both ends thereof open to the atmosphere, the opening in the end of said horn through which sound waves pass being larger in diameter than the opening at the other end of said horn;

first and second magnets spaced along the length of said horn;

a collar positioned in the interior of said horn between said first and second magnets and having a voice coil wound therearound, the diameter of said collar being sized so that the outer surface thereof closely approximates the inside surface of the walls of said horn;

third and fourth magnets mounted to said collar for suspending said collar in the magnetic field of said first magnets and positioning said collar exactly midway therebetween; and a rigid diaphragm mounted across the inside of said collar and dividing said horn for moving the air within the interior of said horn when current is applied to said voice coil, causing said collar to reciprocate within said horn to produce sound waves out the larger diameter opening thereof, the opening at the other end of said horn equalizing the air pressure on either side of said diaphragm.

2. The audio transducer of claim 1 wherein the interior of said horn is provided with stops for limiting the extent of the reciprocation of said collar therein.

3. The audio transducer of claim 1 wherein said diaphragm is positioned at the point of pressure equalization in said horn when positioned at exactly midway between said first and second magnets.

4. The audio transducer of claim 1 wherein said diaphragm is mounted across said collar between said third and fourth magnets.

5. The audio transducer of claim 1 wherein the poles of said first, third, fourth, and second magnets are placed in an S-N-n-s-s-n-N-S orientation, with respect to the open end.

* * * * *